United States Patent
Dutterer

(10) Patent No.: US 11,192,272 B2
(45) Date of Patent: Dec. 7, 2021

(54) TABLE SAW WITH FENCE ALIGNMENT SYSTEM AND METHODS

(71) Applicant: TECHTRONIC CORDLESS GP, Anderson, SC (US)

(72) Inventor: David E. Dutterer, Belton, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 110 days.

(21) Appl. No.: 16/427,608

(22) Filed: May 31, 2019

(65) Prior Publication Data

US 2020/0376706 A1    Dec. 3, 2020

(51) Int. Cl.
| | |
|---|---|
| *B27B 27/10* | (2006.01) |
| *B27B 27/02* | (2006.01) |
| *B23D 47/02* | (2006.01) |
| *B23D 45/06* | (2006.01) |

(52) U.S. Cl.
CPC .............. *B27B 27/10* (2013.01); *B23D 45/06* (2013.01); *B23D 47/02* (2013.01); *B27B 27/02* (2013.01)

(58) Field of Classification Search
CPC ......... B27B 27/10; B27B 27/02; B27B 27/04; B27B 27/00; B27B 27/06; B27B 27/08; B26B 27/06; B26B 27/08; B23D 47/02; B23D 45/06
See application file for complete search history.

(56) References Cited

U.S. PATENT DOCUMENTS

| | | | | |
|---|---|---|---|---|
| 4,206,910 | A | * | 6/1980 | Biesemeyer ............. B23Q 1/28 144/253.1 |
| 4,696,213 | A | * | 9/1987 | Conneally ............... B27B 27/10 269/318 |
| 5,181,446 | A | | 1/1993 | Theising |
| 6,647,847 | B2 | | 11/2003 | Hewitt et al. |
| 7,263,922 | B2 | | 9/2007 | Hewitt et al. |
| 8,312,799 | B2 | | 11/2012 | Frolov |
| 9,095,989 | B2 | * | 8/2015 | Chang ..................... B27B 27/10 |
| 9,259,850 | B2 | * | 2/2016 | Hendrickson ........... B27B 27/02 |
| 9,272,439 | B2 | * | 3/2016 | Dammertz .............. B27B 27/02 |
| 9,592,623 | B2 | | 3/2017 | Frolov |
| 9,757,871 | B2 | | 9/2017 | Burke et al. |
| 10,092,968 | B2 | * | 10/2018 | Fulmer .................. B23D 45/06 |
| 2002/0050201 | A1 | | 5/2002 | Lane et al. |
| 2004/0107812 | A1 | * | 6/2004 | Yu ........................... B27B 27/02 83/438 |
| 2004/0107813 | A1 | * | 6/2004 | Hewitt .................... B27B 27/02 83/446 |
| 2004/0226425 | A1 | | 11/2004 | Hewitt et al. |
| 2005/0139056 | A1 | * | 6/2005 | Gass ....................... B27B 27/02 83/438 |
| 2008/0072728 | A1 | * | 3/2008 | Oberheim ............... B27B 5/222 83/522.26 |

(Continued)

*Primary Examiner* — Jonathan G Riley
(74) *Attorney, Agent, or Firm* — Merchant & Gould P.C.

(57) ABSTRACT

A table saw includes a frame; a saw having a cutting blade supported by the frame; first and second rails extending along opposite sides of the frame; a table supported by the frame; and a fence extending across the table between the first and second rail. A fence holder removably secures the fence to the first rail. The fence holder has a housing and an alignment arrangement configured to balance opposing forces between the fence holder housing and the first rail to hold the fence in a fixed angle relative to the first and second rails.

17 Claims, 9 Drawing Sheets

(56) References Cited

U.S. PATENT DOCUMENTS

| | | | |
|---|---|---|---|
| 2008/0271583 A1* | 11/2008 | Chuang | B27B 27/02 83/438 |
| 2009/0084238 A1* | 4/2009 | Chang | B27B 27/10 83/441.1 |
| 2014/0182436 A1* | 7/2014 | Dammertz | B27B 27/02 83/440 |
| 2017/0368710 A1 | 12/2017 | Burke et al. | |
| 2019/0202080 A1* | 7/2019 | Frolov | B27B 27/08 |
| 2020/0180087 A1* | 6/2020 | Chang | B27B 27/08 |
| 2020/0376574 A1* | 12/2020 | Fulmer | B23D 59/00 |

* cited by examiner

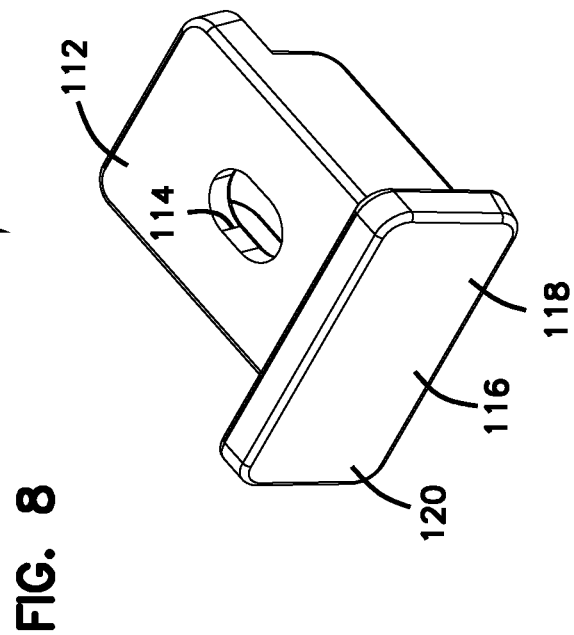
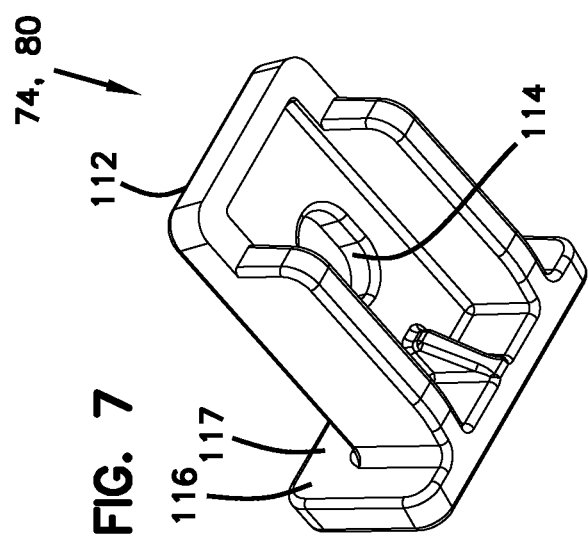

TABLE SAW WITH FENCE ALIGNMENT SYSTEM AND METHODS

TECHNICAL FIELD

This disclosure concerns a table saw. More particularly, this disclosure relates to a table saw having a fence alignment system and methods of use.

BACKGROUND

Typical table saws have a saw blade attached to a motor mounted beneath a work surface/table. The table has an opening that allows a portion of the blade to extend therethrough. To make a cut, a user places material on the table and directs the material through the rotating blade. To assist users in making accurate cuts, most table saws include a material guide in the form of a fence.

A fence functions as a guide to assist users in making cuts through the workpiece. In many applications, the fence is parallel to the cutting direction of the blade and extends across the table. In order to make cuts of varying workpiece width, a user slides the fence closer to or farther from the blade. To ensure the cut is accurate, the fence should be orthogonal (or square) with the side rails along the table.

SUMMARY

In one aspect, a table saw is provided having a frame; a saw with a cutting blade supported by the frame; a first rail and a second rail extending along opposite sides of the frame; a table supported by the frame configured to support a workpiece; a fence an extension across the table between the first rail and second rail and being positionable along the table spaced form the cutting blade; and a fence holder removably securing the fence to the first rail. The fence holder has a housing and an alignment arrangement configured to balance opposing forces between the fence holder housing and the first rail to hold the fence in a fixed angle relative to the first and second rails.

In one embodiment, the alignment arrangement includes at least a first pair of alignment members exerting opposite forces between the fence holder housing and the first rail. The alignment arrangement may also include a second pair of alignment members exerting opposite forces between the fence holder housing and the first rail.

In some arrangements, the first pair of alignment members comprise a first clamp and a first spring-loaded pin. The first clamp exerts a pushing force against the first rail, and the first spring-loaded pin exerts a pulling force on the first rail.

The second pair of alignment members can include a second clamp and a second spring-loaded pin. The second clamp exerts a pushing force against the first rail, and the second spring-loaded pin exerts a pulling force on the first rail.

In some embodiments, the first clamp and the first spring-loaded pin are secured to the housing with a fastener. The second clamp and the second spring-loaded pin are secured to the housing with a fastener.

In preferred arrangements, each of the first spring-loaded pin and second spring-loaded pin has a gripper with a hook engaging a ridge along the first rail.

In many embodiments, each of the first clamp and the second clamp has an end face abutting a side wall of the first rail.

In many arrangements, the fence holder includes a locking handle to releasably secure the fence to the first rail.

The locking handle can be between the first pair of alignment members and the second pair of alignment members.

In example embodiments, the locking handle is centered between the first pair of alignment members and the second pair of alignment members.

In some preferred arrangements, the fence holder includes a locking handle to releasably secure the fence to the first rail. The first spring-loaded pin is located between the first clamp and the locking handle. The second spring-loaded pin is located between the second clamp and the locking handle. The locking handle is located between the first spring-loaded pin and the second spring-loaded pin.

In many arrangements, the fence is parallel to the cutting blade.

In many arrangements, the fixed angle between the fence and the first and second rails is 90°.

In another aspect, a method of using a table saw is provided. In general, the method includes providing a table saw having a frame, a saw having a cutting blade supported by the frame, a first rail and a second rail extending along opposite sides of the frame, a table supported by the frame configured to support a workpiece, and a fence in extension across the table between the first rail and second rail. The method includes positioning the fence along the table at a desired space from the cutting blade. The method includes a step of securing the fence to the first rail with a first fence holder. The method also includes a step of holding the fence at a fixed angle relative to the first rail and second rail by balancing opposing forces between the fence holder and the first rail.

In many preferred methods, the step of securing the fence includes using a locking handle to releasably secure the fence to the first rail.

The step of balancing opposing forces can include using at least a first pair of alignment members to exert opposite forces between the fence holder and the first rail.

The step of balancing forces can include using a second pair of alignment members exerting opposite forces between the fence holder and the first rail.

The step of holding a fence at a fixed angle can include holding the fence at a 90° angle relative to the first rail and second rail.

In another aspect, a table saw is provided. The table saw includes a frame; a saw having a cutting blade supported by the frame; a first rail and a second rail extending along opposite sides of the frame; a table supported by the frame configured to support a workpiece; a fence in extension across the table between the first rail and second rail and being positionable along the table spaced from the cutting blade; and a fence holder removably securing the fence to the first rail. The fence holder includes a clamp arrangement exerting a pushing force against the first rail, and a pin arrangement exerting a pulling force on the first rail.

In many embodiments, the fence holder has a housing, and the clamp arrangement and pin arrangement balance opposing forces between the housing and the first rail to hold the fence in a fixed angle relative to the first and second rails.

In example embodiments, the fence holder includes a locking handle to releasably secure the fence to the first rail. The clamp arrangement includes a first clamp and a second clamp, each exerting a pushing force against the first rail. The pin arrangement includes a first spring-loaded pin located between the first clamp and the locking handle. The pin arrangement includes a second spring-loaded pin located between the second clamp and the locking handle. The locking handle is located between the first spring-loaded pin and the second spring-loaded pin.

Other aspects of this disclosure will become apparent by consideration of the detailed description and accompanying drawings.

BRIEF DESCRIPTION OF THE DRAWINGS

FIG. 7 is a bottom perspective view of one of the clamps used with the fence holder of FIGS. 3 and 4;

FIG. 8 is a top perspective view of the clamp of FIG. 7;

DETAILED DESCRIPTION

Figure 1:
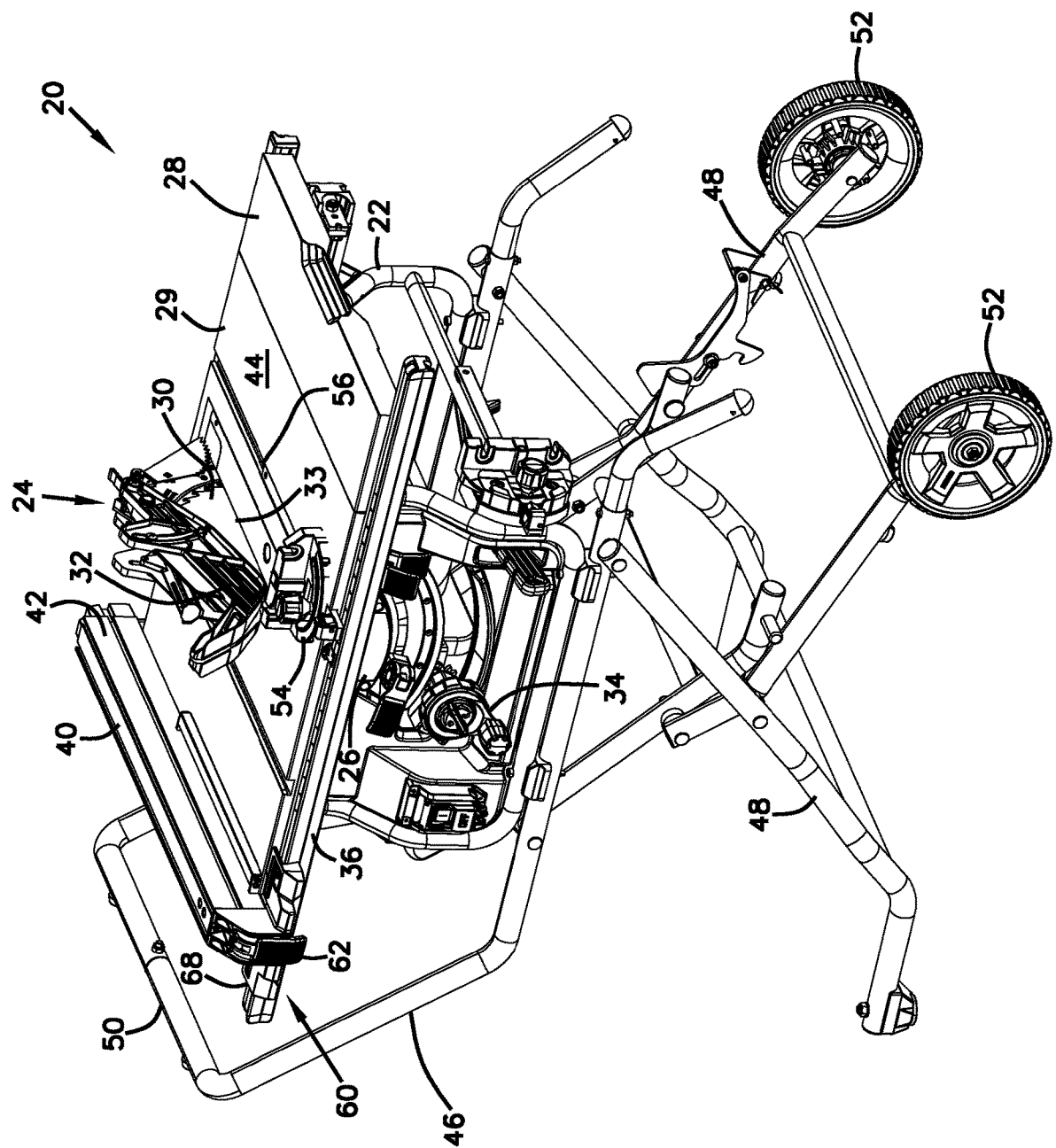
FIG. 1 is a perspective view of one embodiment of a table saw constructed in accordance with principles of this disclosure.

In FIG. 1, a table saw is shown at 20. The table saw 20 includes a frame 22. The frame 22 holds and supports a saw 24. The saw 24 has a motor 26, which is energized either by a battery, typically a rechargeable battery pack, or through another source of power such as a power cord. The saw motor 26 is typically supported by the frame 22 at a position below a work table 28.

The table 28 is supported by the frame 22 and it configured to support a workpiece on an upper surface 29 of the table 28, which also corresponds to a work surface 44. The saw 24 has a cutting blade 30, which extends through an opening 33 in the table 28. A blade guard 32 removably covers the blade 30 above the upper surface 29 of the table 28. A height of the blade 30 extending above the upper surface 29 of the table 28 can be adjusted such as via a hand wheel 34, which in this embodiment, is supported by the frame 22 and below a lower surface 31 (FIG. 9) of the table 28. The lower surface 31 is the side of the table 28 opposite of the upper surface 29.

Figure 2:
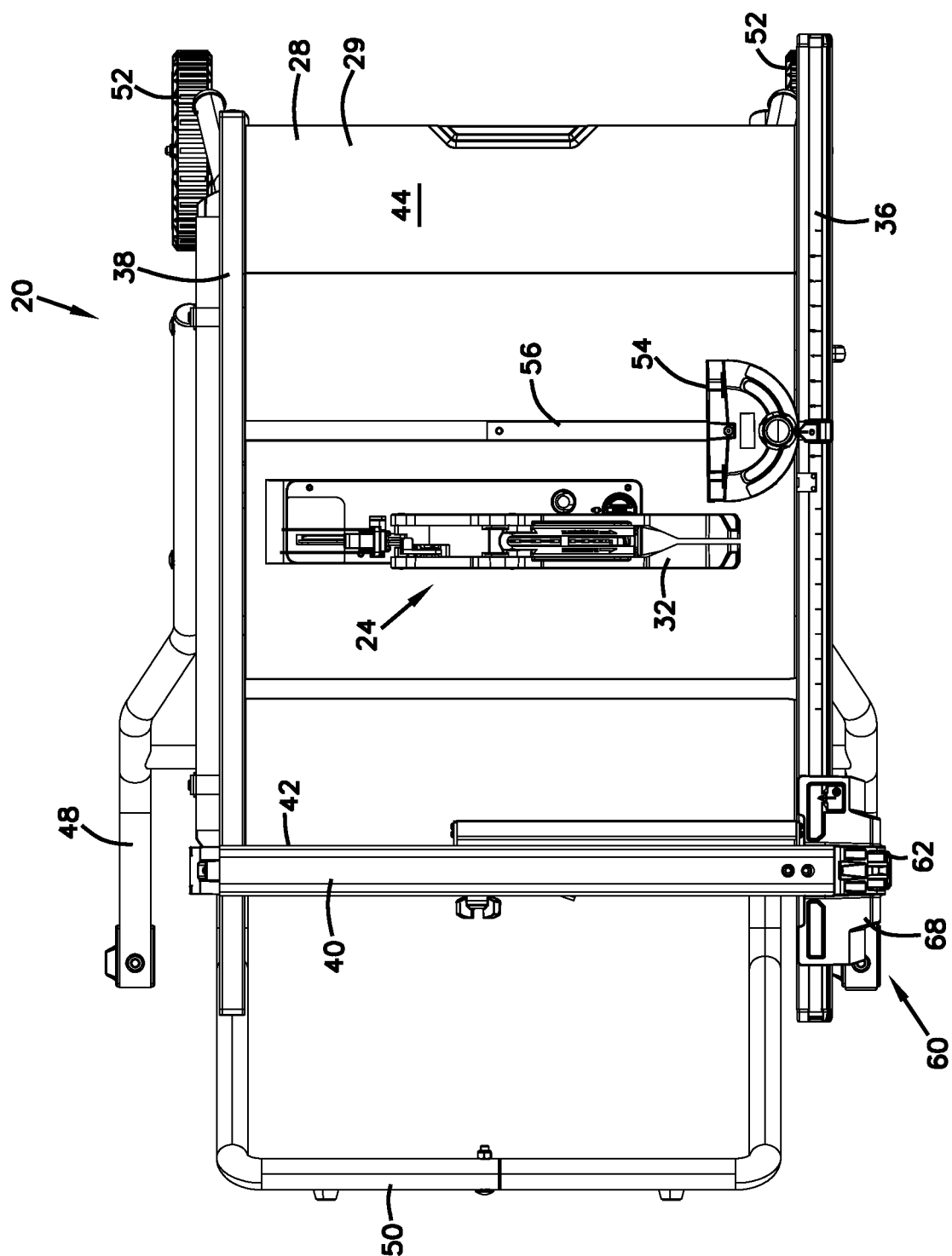
FIG. 2 is a top plan view of the table saw of FIG. 1.

Extending along opposite sides of the frame 22 and along opposite sides of the table 30 is a first rail 36 and a second rail 38 (FIG. 2). In this embodiment, the first and second rails 36, 38 are general orthogonal to the direction of the blade 30 and parallel to the axis of rotation of the blade 30.

The table saw 20 includes a fence 40. The fence 40 is in extension across the table 30 between the first rail 36 and second rail 38. The fence 40 is positionable along the table 28 spaced from the cutting blade 30. The fence 40 functions to provide support to the workpiece, as the workpiece slides along an engagement face 42 of the fence 40 toward the cutting blade 30. The engagement face 42 is typically oriented at a 90° angle to the work surface 44 of the table 28.

Other components visible in the FIG. 1 embodiment include a mobile cart 46. The cart 46 supports and holds the frame 22. The cart 46 has legs 48, a steering handle 50, and wheels 52. These components allow the table saw 20 to be easily portable. The legs 48 can be adjusted in different positions to adjust the height of the table saw 28 from the ground or floor surface.

In this embodiment, the table saw 20 also includes a miter gauge 54. The miter gauge 54 is usable for making miter cuts in the workpiece. The table 28 has a miter slot 56 to allow for adjustment of the miter gauge 54.

Still in reference to FIG. 1, the table saw 20 includes a fence holder 60. The fence holder 60 removably secures the fence 40 to the first rail 36. The fence holder 60 includes components to hold the fence 40 in a fixed angle relative to the first and second rails 36, 38. Typically, the fence 40 will be held at a 90° angle relative to the first and second rails 36, 38 in order to keep the fence square with the rails 36, 38 as the fence 60 is adjustably moved along the rails 36, 38. These components are described further below.

Figure 3:
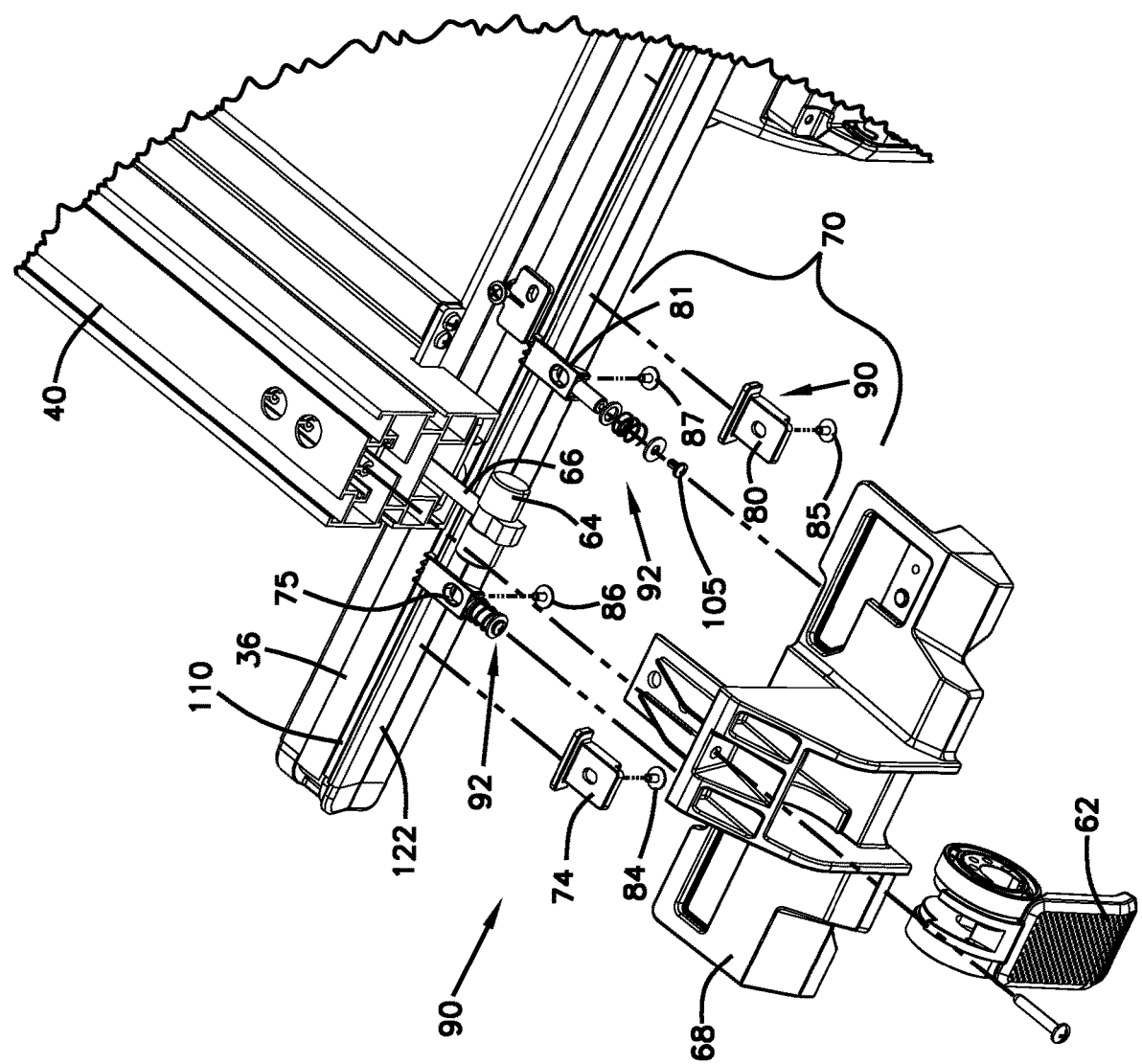
FIG. 3 is an exploded, perspective view of a portion of a fence, rail, and fence holder used in the table saw of FIGS. 1 and 2.

The fence 40 is adjustable along the rails 36, 38, in order to select the proper spacing between the fence 40 and the cutting blade 30. In this embodiment, a locking handle 62 is used to release, and then secure the fence holder 60 to the first rail 36. In FIG. 1, the locking handle 62 can be seen in the locked position. To unlock the handle 62, the handle 62 is pivoted or rotated in a direction away from the first rail 36 upwardly, which releases force on a holding pin 64 held by a bar 66 (FIG. 3). The bar 66 extends to and is attached to the second rail 38. When the force is released from the pin 64 and bar 66, the fence 40 can then be moved laterally along the table 28 either closer or farther from the blade 30. When the desired position is found, the locking handle 62 is pivoted downwardly, toward the first rail 36, which pulls the pin 64 and bar 66 to lockably engage the fence holder 60 and the fence 40 and lock the fence 40 in the position to the first rail 36 and second rail 38.

In accordance with principles of this disclosure, the fence holder 60 includes a housing 68. In the embodiment shown, the housing 68 is secured to the fence 40 and holds internal alignment components, discussed below. The housing 68 can also hold the lockable handle 62 in place.

In accordance with principles of this disclosure, the fence holder 60 includes an alignment arrangement 70 (FIG. 3). The alignment arrangement 70 is configured to balance opposing forces between the fence holder housing 68 and the first rail 36 to hold the fence 40 in a fixed angle relative to the first and second rails 36, 38.

In particular, the alignment arrangement 70 helps to hold the fence 40 at a fixed angle, which is typically a 90° angle, relative to the first rail 36 and second rail 38. This alignment arrangement 70 ensures that the fence 40 remains square with the rails 36, 38 and parallel to the blade 30. In this way, more precise cuts may be made.

Figure 4:
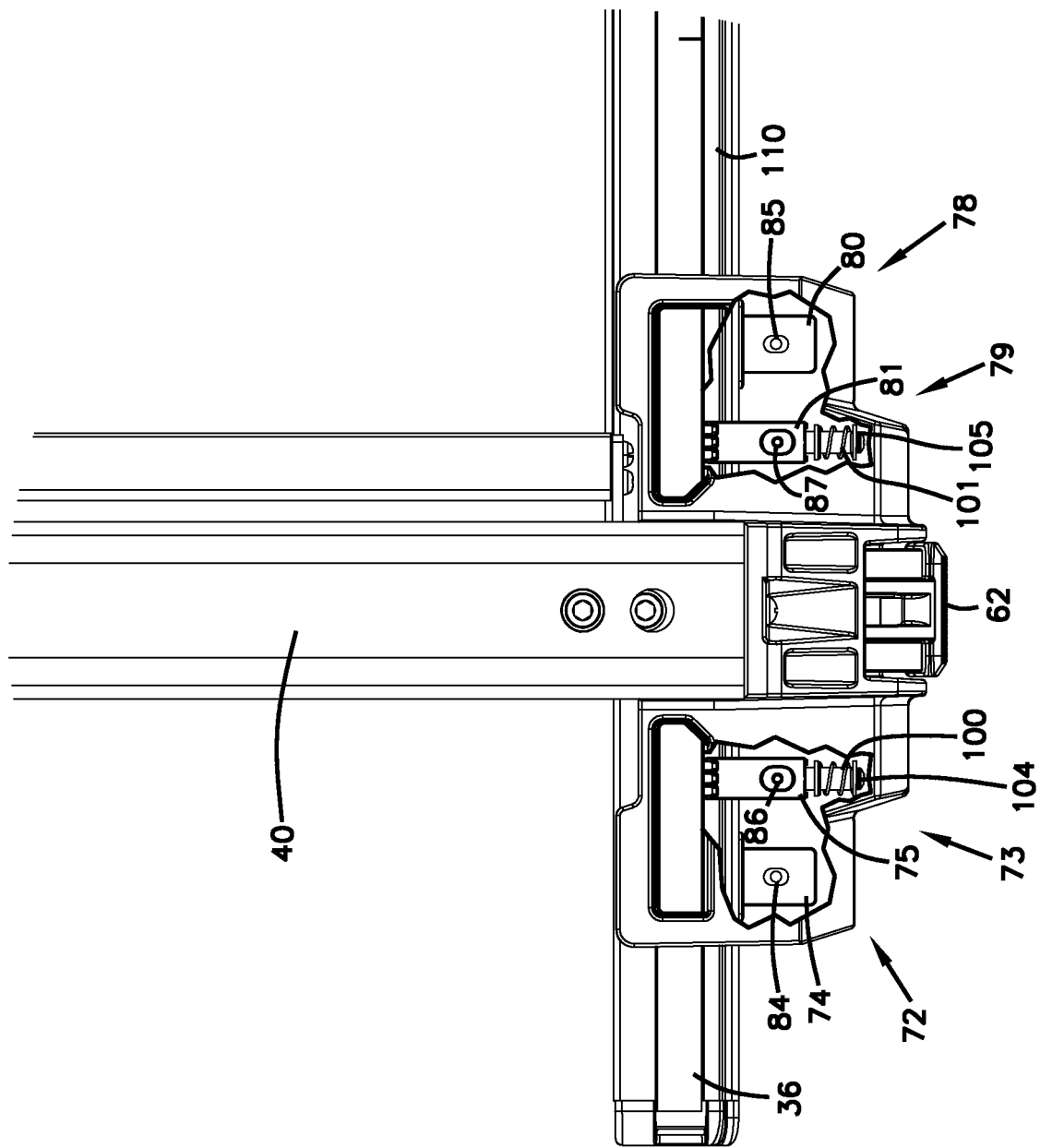
FIG. 4 is a top plan view of the assembled fence holder and fence of FIG. 3, with portions broken away to reveal internal components.

In the embodiment of FIGS. 3 and 4, the alignment arrangement 70 includes at least a first pair of alignment members 72, 73 exerting opposite forces between the fence holder housing 68 and the first rail 36.

While many embodiments are possible, in the particular one shown in the figures, the first pair of alignment members includes a first clamp 74 and a first spring-loaded pin 75. The first clamp 74 exerts a pushing force against the first rail 36, and the first spring-loaded pin 75 exerts a pulling force on the first rail 36.

In preferred arrangements, the alignment arrangement 70 further includes a second pair of alignment members, 78, 79 exerting opposite forces between the fence holder housing 68 and the first rail 36.

Again, while many different embodiments are possible, in the embodiment shown, the second pair of alignment members 78, 79 includes a second clamp 80 and a second spring loaded pin 81. The second clamp 80 exerts a pushing force against the first rail 36, and the second spring-loaded pin 81 exerts a pulling force on the first rail 36.

Figure 11:
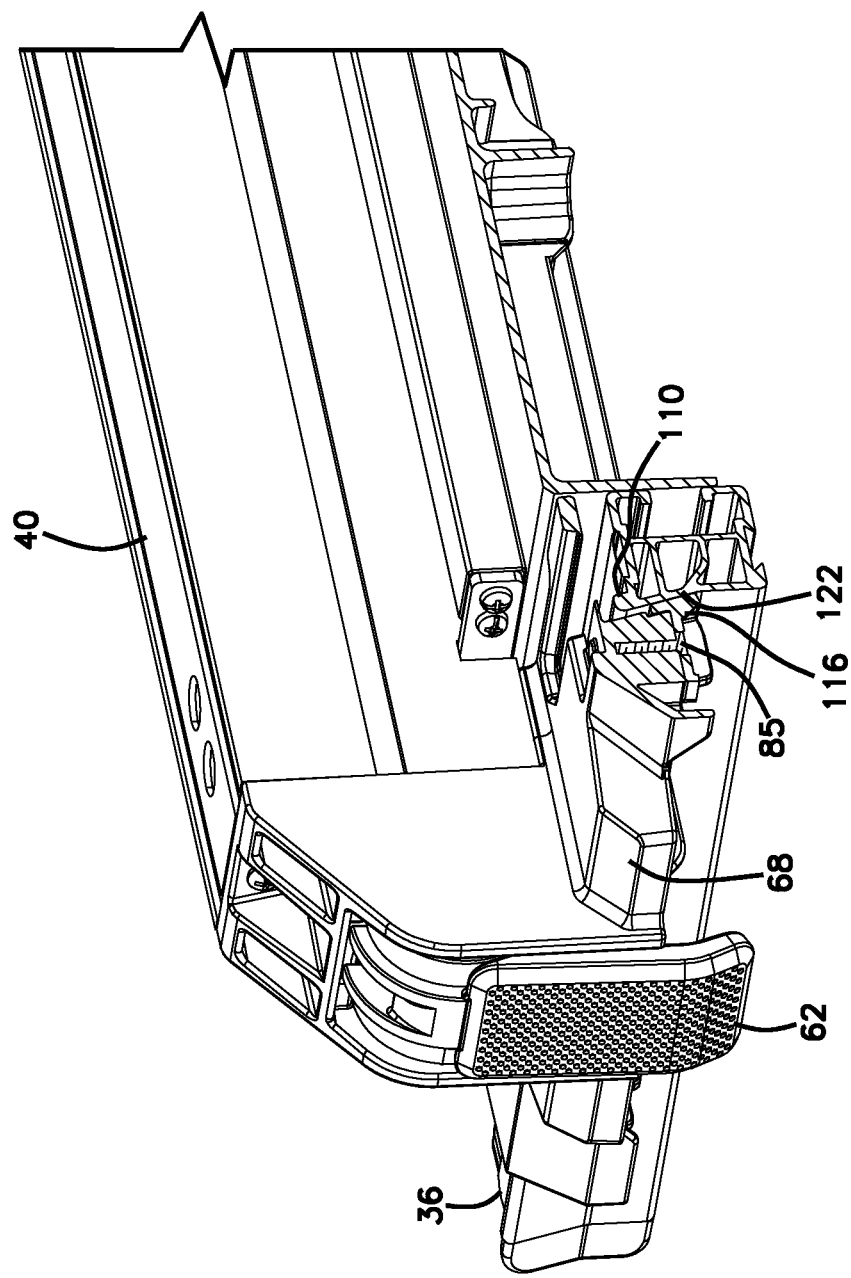
FIG. 11 is a cross-sectional view of the table saw portion of FIG. 9, the cross-section being taken along the line 11-1 of FIG. 9 and showing a second component of an alignment arrangement.

Still in reference to FIGS. 3, 4, and 11, each of the clamps 74, 80 is secured to the housing 68. While many different embodiments are possible, in this embodiment, the clamps 74, 80 are secured to the housing 68 with a suitable fastener 84, 85.

Similarly, each of the spring-loaded pins 75, 81 are secured to the housing 68 with a suitable fastener 86, 87.

As can be appreciated from the depiction in FIGS. 3 and 4, the locking handle 62 is oriented between the first pair of alignment members 72, 73 and the second pair of alignment members 78, 79. Preferably, the locking handle 62 is centered between the first pair of alignment members 72, 73 and the second pair of alignment members 78, 79.

In the example embodiment shown, the first spring-loaded pin 75 is located between the first clamp 74 and the locking handle 62. The second spring loaded pin 81 is located between the second clamp 80 and the locking handle 62. The locking handle 62 is located between the first spring-loaded pin 75 and the second spring loaded pin 81. Other arrangements are possible, including, for example, the clamps 74, 80 could be located on either side of the locking handle 62, while the spring loaded pins 75, 81 could be located along the outer periphery of the housing 68. For example, the relative positions of the clamps 74, 80 and pins 75, 81 could be switched with each other.

It should be appreciated that each of the clamps 74, 80 is part of a clamp arrangement 90 (FIG. 3), which exerts a pushing force against the first rail 36. Each of the spring-loaded pins 75, 81 is part of a pin arrangement 92 (FIG. 3) which exerts a pulling force on the first rail 36.

Figure 5:
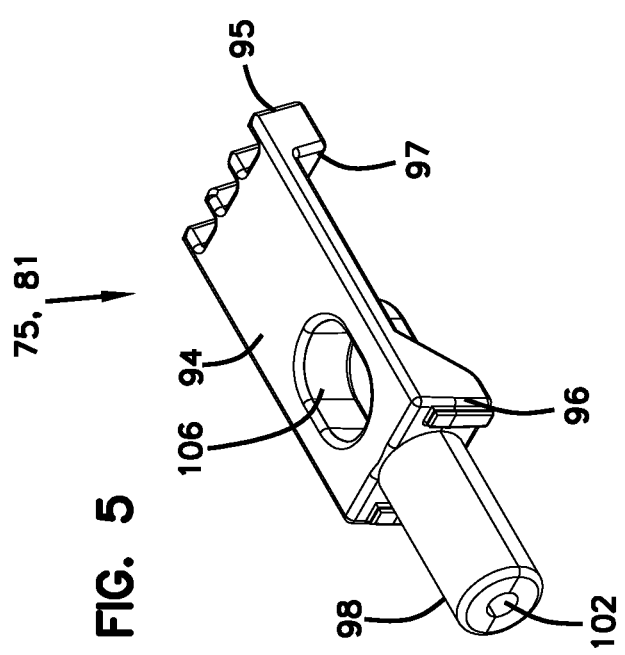
FIG. 5 is a top perspective view of one of the pins used with the fence holder of FIGS. 3 and 4.
Figure 6:
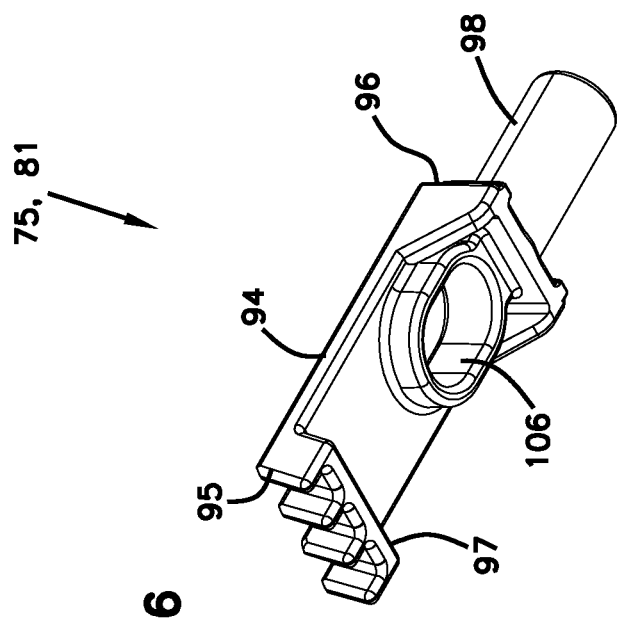
FIG. 6 is a bottom perspective view of the pin of FIG. 5.
Figure 10:
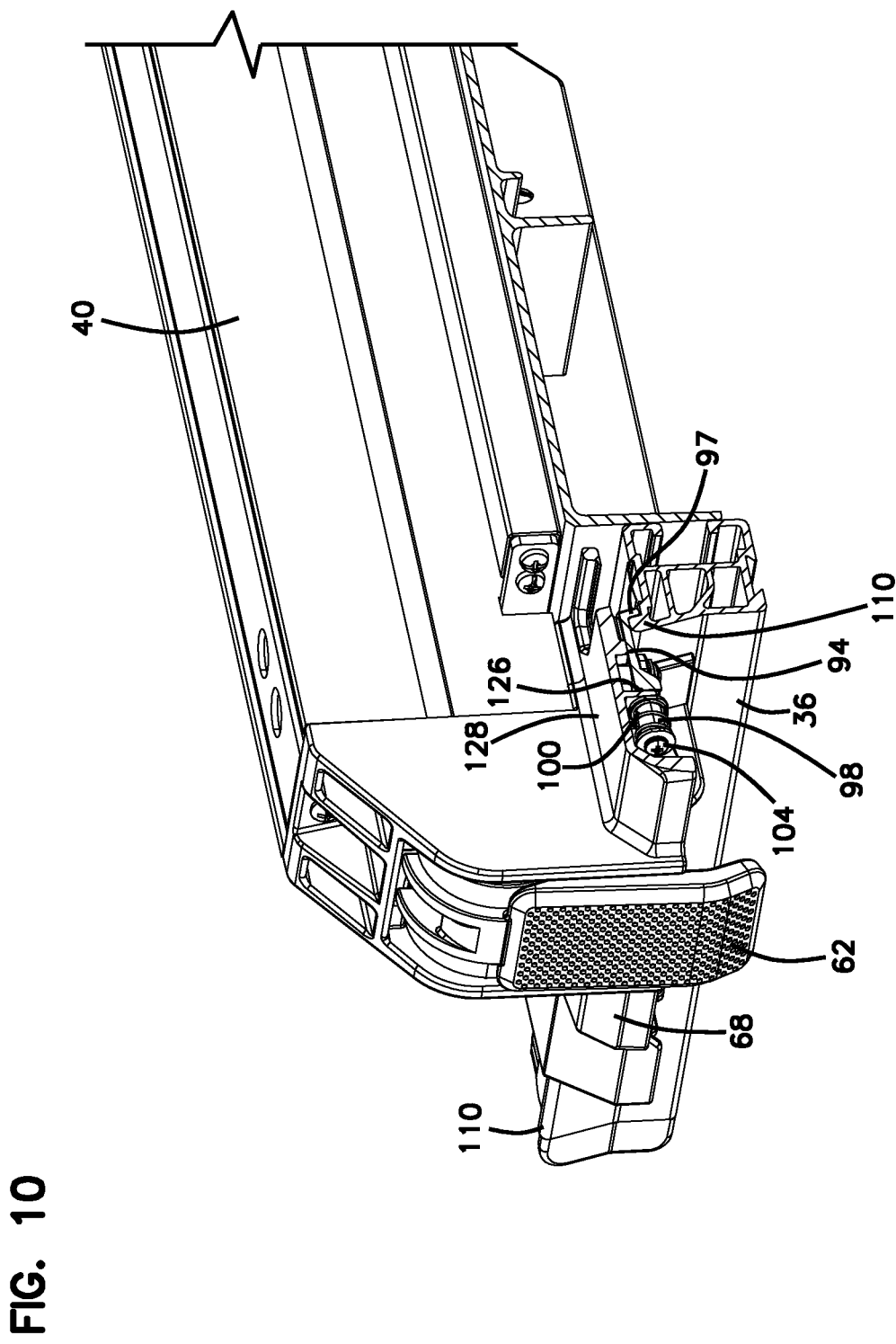
FIG. 10 is a cross-sectional view of the table saw portion of FIG. 9, the cross-section being taken along the line 10-10 of FIG. 9 and showing one component of an alignment arrangement.

Attention is directed to FIGS. 5, 6, and 10. An example embodiment of structures usable for the spring-loaded pins 75, 81 are illustrated. The spring-loaded pin 75, 81 includes a gripper 94. The gripper 94 includes opposite terminal ends 95, 96. At terminal end 95 is a claw or hook 97 extending at a non-zero angle relative to the gripper 94. The non-zero angle is generally about 90° (e.g., within +/−5° of 90°). As can be seen in FIGS. 3 and 10, the hook 97 of each of the spring-loaded pins 75, 81 engages a protruding ridge 110 along the first rail 36.

Extending from the opposite terminal end 96 is a post 98. The post 98 holds a spring 100, 101 (FIG. 4). The end of the post 98 has an opening 102 (FIG. 5) for accepting a fastener 104, 105 (FIG. 4) for securing the springs 100, 101.

In reference now to FIGS. 5 and 6, the spring-loaded pins 75, 81 include a through-hole 106. In the embodiment shown, extending through the gripper 94 is elongated through-hole 106. The through-hole 106 receives the fasteners 85, 87 to secure the spring-loaded pin 75, 81 to the housing 68. Because the through-hole 106 is elongated, the respective fastener 85, 87 can slide along the through-hole 106 in response to forces between the housing 68 and the first rail 36.

Figure 9:
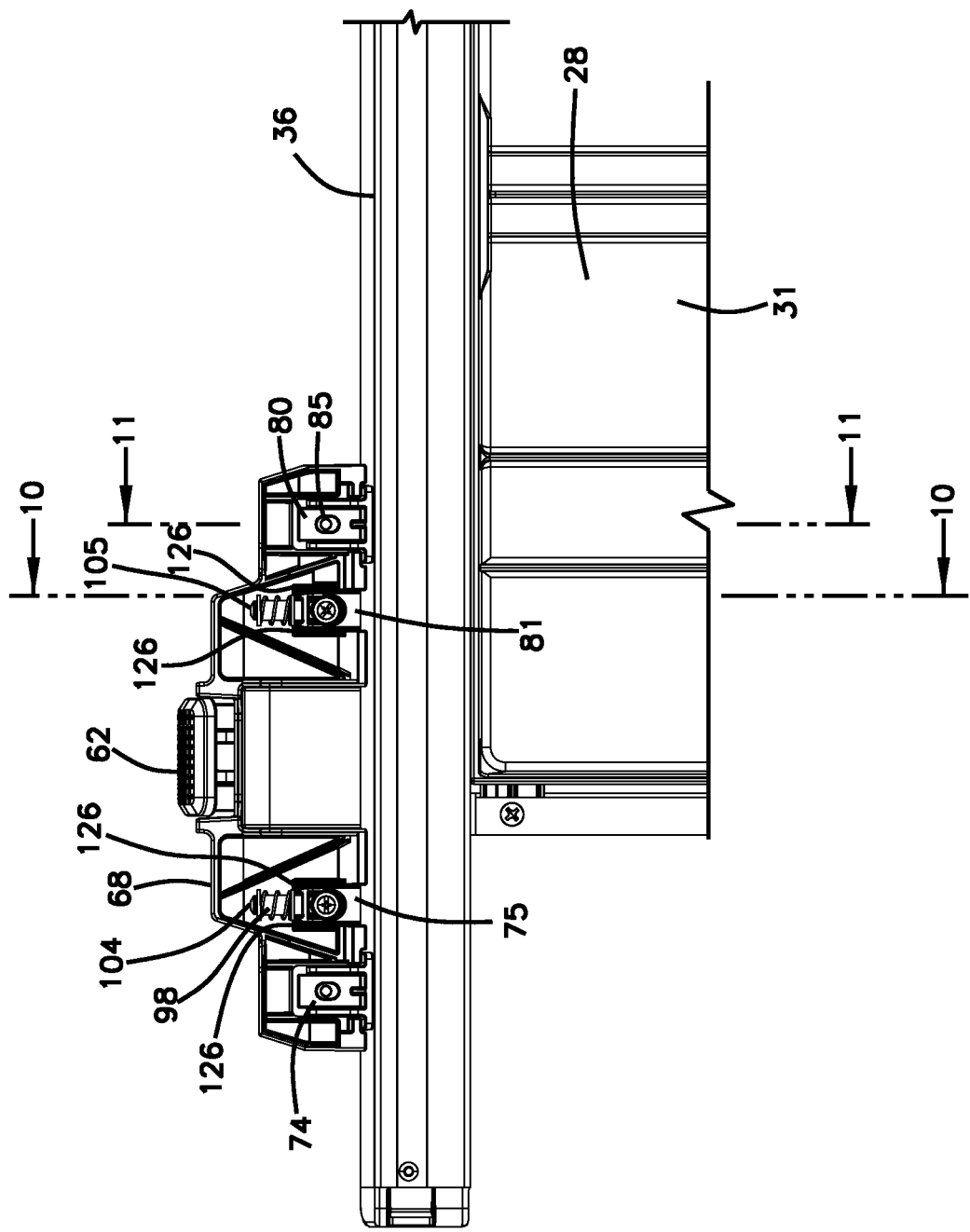
FIG. 9 is a bottom plan view of a portion of the table saw of FIG. 1, depicting a portion of a table, a rail, and a housing for a fence holder.

Each spring-loaded pin 75, 81 is mounted within the housing 68 of the fence holder 60 such that the post 98 holding the spring 100 is separated from the gripper 94 by holding flanges 126 (FIGS. 9 and 10). The flanges 126 extend generally at a perpendicular angle relative to an upper portion 128 of the housing 68. In the orientation shown in FIG. 10, the flanges 126 extend vertically downwardly from the generally horizontal upper portion 128 of the housing 68. The flanges 126 provide a surface in which the spring 100 can press against, such that as the alignment arrangement 70 adjusts to balancing the forces between the fence holder housing 68 and the first rail 36, the spring-loaded pins 75, 81 can move in an axial direction relative to the first rail 36, which adjusts the amount of pulling force that is exerted on the first rail 36. The fasteners 85, 87, which extend through the gripper 94 can slide axially along the elongated through-hole 106.

In reference now to FIGS. 7, 8, and 11, an example embodiment of usable clamps 74, 80 are shown. This is just one example of many possibilities. The clamp 74, 80 includes a holding piece 112. The holding piece 112 is generally planar for mounting against a surface of the housing 68. The holding piece 112 includes an elongated through-hole 114 for receiving fastener 84 or 86 to secure the clamp 74, 80 to the housing 68. Because the through-hole 114 is elongated, the respective fastener 84, 86 can slide along the through-hole 114 in response to forces between the housing 68 and the first rail 36.

At a terminal end of the holding piece 112 is an end piece 116. The end piece 116 is generally perpendicular to the holding piece 112. The end piece 116 has opposite sides including first side 117 (FIG. 7) and second side 118 (FIG. 8). The second side 118 functions as an end face 120 to abut a side wall 122 (FIGS. 3 and 11) of the first rail 36.

The above structure can be used in a method of using a table saw. The method includes providing table saw 20 having frame 22. The table saw 20 has cutting blade 30 supported by the frame 22 and first and second rails 36, 38 along opposite sides of the frame 22. Table 28 is supported by the frame 22 and is configured to support a workpiece. Fence 40 extends across the table 28 between the first rail 36 and second rail 38.

The method includes positioning of the fence 40 along the table 28 at a desired space from the cutting blade 30. This step can include, for example, unlocking the locking handle 62, by pivoting the handle 62 in an upward direction away from the table 28, and then laterally moving the fence 40 either closer to or farther away from the cutting blade 30.

The method can include securing the fence 40 to the first rail 36 with the fence holder 60. This step can include, for example, using the locking handle 62 to secure the fence 40 in its position relative to the first rail 36. For example, the fence 40 can be secured in the desired location by reengaging the locking handle 62 by rotating it back into its locking position as shown in FIG. 1.

The method further includes a step of holding the fence 40 at a fixed angle relative to the first rail 36 and second rail 38 by balancing opposing forces between the fence holder 60 and the first rail 36. Balancing the opposing forces can include, for example, using a first pair of alignment members 72, 73 to exert opposite forces between the fence holder 60 and the first rail 36. The step of balancing the forces may also include using a second pair of alignment members 78, 79 to exert opposite forces between the fence holder 60 and the first rail 36.

In further example methods, the step of using the first pair of alignment members includes using first clamp 74 and first spring-loaded pin 75. The step of using the second pair of alignment members can include using the second clamp 80 and second spring-loaded pin 81.

In many example method, the step of holding the fence 40 at a fixed angle includes holding the fence 40 at a 90° angle relative to the first rail 36 and second rail 38.

The above represents example principles. Many embodiments can be made using these principles.

What is claimed is:

1. A table saw comprising:
    (a) a frame;
    (b) a saw having a cutting blade supported by the frame;
    (c) a first rail and a second rail extending along opposite sides of the frame, wherein the first rail extends along a first direction;
    (d) a table supported by the frame configured to support a workpiece;
    (e) a fence in extension across the table between the first rail and the second rail and being positionable along the table spaced from the cutting blade; and
    (f) a fence holder removably securing the fence to the first rail,
        the fence holder having a housing and an alignment arrangement configured to balance opposing forces between the housing and the first rail to hold the fence at a fixed angle relative to the first rail and the second rail, wherein the alignment arrangement includes at least a first pair of alignment members that comprise a first pushing member comprising a first clamp having an end face abutting a sidewall of the first rail exerting a pushing force against the first rail and in a second direction, and a first pulling member comprising a first spring-loaded pin having a spring, a post holding the spring, and a gripper extending axially from the post, the gripper having a hook engaging a ridge along the first rail exerting a pulling force on the first rail and in the second direction, the second direction being orthogonal to the first direction, and wherein the first pushing member and the first pulling member are spaced apart along the first direction with a gap formed therebetween.

2. The table saw of claim 1, wherein the alignment arrangement includes a second pair of alignment members comprising a second pushing member and a second pulling member exerting opposite forces between the housing and the first rail.

3. The table saw of claim 1, wherein the first spring-loaded pin is biased along the second direction to exert the pulling force.

4. The table saw of claim 2, wherein the second pushing member comprises a second clamp and the second pulling member comprises a second spring-loaded pin, the second spring-loaded pin being biased along the second direction to exert the pulling force.

5. The table saw of claim 1, wherein the first clamp and the first spring-loaded pin are secured to the housing with a fastener.

6. The table saw of claim 1, wherein the fence holder includes a locking handle to releasably secure the fence to the first rail.

7. The table saw of claim 6, wherein the locking handle is disposed between the first pair of alignment members and a second pair of alignment members.

8. The table saw of claim 7, wherein the locking handle is centered between the first pair of alignment members and the second pair of alignment members.

9. The table saw of claim 4, wherein:
    (a) the fence holder includes a locking handle to releasably secure the fence to the first rail;
    (b) the first spring-loaded pin is located between the first clamp and the locking handle; and
    (c) the second spring-loaded pin is located between the second clamp and the locking handle; and
    (d) the locking handle is located between the first spring-loaded pin and the second spring-loaded pin.

10. The table saw of claim 1, wherein the fence is parallel to the cutting blade.

11. The table saw of claim 1, wherein the fixed angle between the fence and the first and second rails is 90°.

12. A method comprising:
    (a) providing a table saw comprising:
        a frame;
        a saw having a cutting blade supported by the frame;
        a first rail and a second rail extending along opposite sides of the frame, wherein the first rail includes a protruding ridge and a sidewall;
        a table supported by the frame configured to support a workpiece; and
        a fence in extension across the table between the first rail and the second rail;
    (b) positioning the fence along the table at a desired space from the cutting blade;
    (c) securing the fence to the first rail with a fence holder having a locking handle, wherein the locking handle is engaged with both the first rail and the second rail to secure the position of the fence; and
    (d) holding the fence at a fixed angle relative to the first rail and the second rail by balancing opposing forces between the fence holder and the first rail with at least a first pair of alignment members that include a pushing member having a clamp member with an end face abutting the sidewall of the first rail exerting a pushing force against the first rail and a pulling member having a spring-loaded pin having a spring, a post holding the spring, and a gripper extending axially from the post, the gripper having a hook engaging the protruding ridge of the first rail exerting a pulling force on the first rail, and wherein the pushing member and the pulling member are spaced apart along the first rail with a gap formed therebetween.

13. The method of claim 12, wherein balancing opposing forces includes using a second pair of alignment members including a pushing member and a pulling member that exert opposite forces between the fence holder and the first rail.

14. The method of claim 12, wherein holding the fence at a fixed angle includes holding the fence at a 90° angle relative to the first rail and the second rail.

15. A table saw comprising:
    (a) a frame;
    (b) a saw having a cutting blade supported by the frame;
    (c) a first rail and a second rail extending along opposite sides of the frame, the first rail being parallel to an axis of rotation of the cutting blade;
    (d) a table supported by the frame configured to support a workpiece;
    (e) a fence in extension across the table between the first rail and the second rail and being positionable along the table spaced from the cutting blade; and
    (f) a fence holder removably securing the fence to the first rail, the fence holder including:
        (i) a housing;
        (ii) a locking handle coupled to the housing and configured to releasably secure the fence to the first rail;

(iii) a clamp arrangement exerting a pushing force against the first rail, wherein the clamp arrangement is coupled to the housing and abuts a sidewall of the first rail such that the position of the clamp arrangement is independent of the locking handle; and (iv) a pin arrangement exerting a pulling force on the first rail, wherein the pin arrangement is coupled to the housing and hooks at least partially around a ridge of the first rail such that the position of the pin arrangement is independent of the locking handle and the clamp arrangement, wherein the pin arrangement has a spring-loaded pin with a spring, a post holding the spring, and a gripper extending axially from the post, the gripper having a hook for engaging the ridge, wherein the clamp arrangement and the pin arrangement are spaced apart along the first rail with a gap formed therebetween, and wherein the pushing force and the pulling force act in a direction that is orthogonal to the axis of rotation of the cutting blade.

16. The table saw of claim 15, wherein the clamp arrangement and the pin arrangement balance opposing forces between the housing and the first rail to hold the fence in a fixed angle relative to the first and second rails.

17. The table saw of claim 15, wherein:
(a) the clamp arrangement includes a first clamp and a second clamp, each exerting a pushing force against the first rail;
(b) the pin arrangement includes a first spring-loaded pin located between the first clamp and the locking handle;
(c) the pin arrangement includes a second spring-loaded pin located between the second clamp and the locking handle; and
(d) the locking handle is located between the first spring-loaded pin and the second spring-loaded pin.

* * * * *